US007662905B2

(12) United States Patent
Ishikawa et al.

(10) Patent No.: US 7,662,905 B2
(45) Date of Patent: *Feb. 16, 2010

(54) COPOLYCARBONATE, COPOLYCARBONATE COMPOSITION, AND OPTICAL MOLDED ARTICLE OBTAINED THEREFROM

(75) Inventors: Yasuhiro Ishikawa, Ichihara (JP); Hiroshi Kawato, Ichihara (JP); Atsushi Sato, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 353 days.

This patent is subject to a terminal disclaimer.

(21) Appl. No.: 10/588,905

(22) PCT Filed: Feb. 21, 2005

(86) PCT No.: PCT/JP2005/002744

§ 371 (c)(1),
(2), (4) Date: Aug. 9, 2006

(87) PCT Pub. No.: WO2005/085320

PCT Pub. Date: Sep. 15, 2005

(65) Prior Publication Data

US 2008/0287610 A1 Nov. 20, 2008

(30) Foreign Application Priority Data

Mar. 3, 2004 (JP) .............................. 2004-058462

(51) Int. Cl.
*C08G 64/00* (2006.01)
*C08G 63/02* (2006.01)

(52) U.S. Cl. ............................ 528/196; 349/65; 349/96; 359/642; 362/247; 362/339; 362/343; 362/615; 362/620; 525/390; 525/391; 525/439; 528/198

(58) Field of Classification Search ................. 359/642; 528/196, 198; 349/65, 96; 362/247, 339, 362/343, 615, 620; 525/390, 391, 439
See application file for complete search history.

(56) References Cited

U.S. PATENT DOCUMENTS

| 4,607,070 | A | 8/1986 | Schreckenberg et al. |
| 4,663,399 | A | 5/1987 | Peters |
| 2005/0119441 | A1* | 6/2005 | Ikeda et al. ................. 528/196 |
| 2009/0080079 | A1* | 3/2009 | Kogure et al. ............... 359/599 |
| 2009/0093583 | A1* | 4/2009 | Kawato et al. .............. 524/502 |

FOREIGN PATENT DOCUMENTS

| DE | 3523977 A1 | 1/1986 |
| JP | 61-016923 | 1/1986 |
| JP | 62-79222 | 4/1987 |
| JP | 2003-096180 | 4/2003 |

OTHER PUBLICATIONS

U.S. Appl. No. 10/587,974, filed Aug. 3, 2006, Ishikawa, et al.

* cited by examiner

*Primary Examiner*—Terressa M Boykin
(74) *Attorney, Agent, or Firm*—Oblon, Spivak, McClelland, Maier & Neustadt, L.L.P.

(57) ABSTRACT

A copolycarbonate; a copolycarbonate composition that contains the copolycarbonate and a polycarbonate resin; a polycarbonate base resin composition that contains the copolycarbonate and an acryl base resin; an optical molded article containing the copolycarbonate; a light guide plate containing the copolycarbonate; a lens containing the copolycarbonate; an optical molded article containing the copolycarbonate composition; a light guide plate containing the copolycarbonate composition; a lens containing the copolycarbonate composition; an optical molded article containing the polycarbonate base resin composition; a light guide plate containing the polycarbonate base resin composition; and an optical molded article containing the polycarbonate base resin composition.

20 Claims, 1 Drawing Sheet

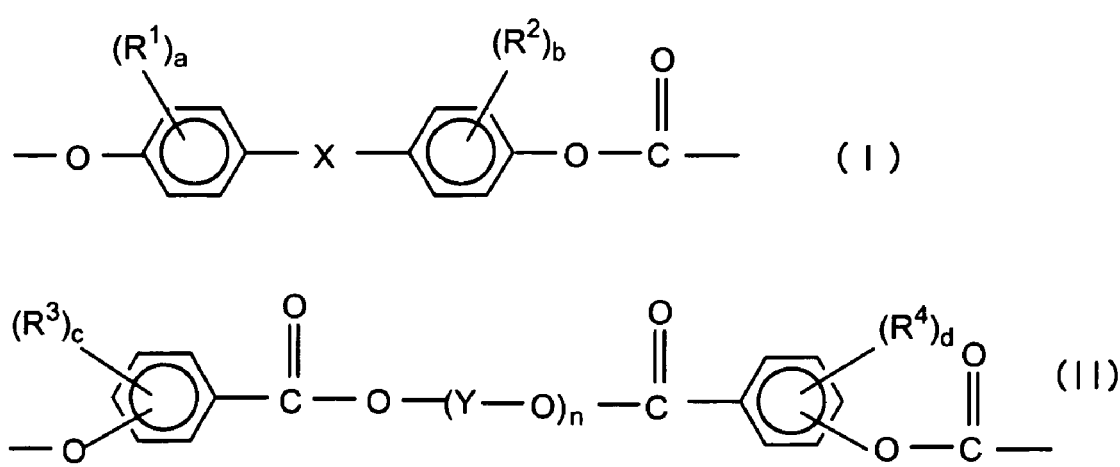

COPOLYCARBONATE, COPOLYCARBONATE COMPOSITION, AND OPTICAL MOLDED ARTICLE OBTAINED THEREFROM

TECHNICAL FIELD

The present invention relates to a copolycarbonate, a copolycarbonate composition, a polycarbonate base resin composition and an optical molded article obtained by using them. More specifically, it relates to a copolycarbonate having a specific repetitive constitutional unit, a copolycarbonate composition containing the above copolycarbonate and other polycarbonate resins, a polycarbonate base resin composition obtained by blending the above matters with an acryl base resin and an optical molded article such as a lens and an light guide plate prepared by molding them.

BACKGROUND ART

A polycarbonate (hereinafter abbreviated as PC) resin is produced primarily from bisphenol A as a raw material and excellent in a transparency, a heat resistance and a mechanical characteristic, and therefore it is used for wide applications. However, involved therein is the problem that when this PC resin is used for optical parts such as lenses, light guide plates, optical disks and the like, satisfactory molded articles are not obtained because of a low fluidity thereof, and the fluidity is desired to be further enhanced, so that various improved polycarbonates are proposed.

A method in which a structure of a PC resin is changed by carrying out copolymerization and modification of a molecular chain terminal is reported as a method for improving the fluidity. For example, a PC resin in which a molecular chain terminal is modified by a long chain alkyl group is proposed (refer to, for example, a Patent Document 1). However, a terminal-modified PC resin obtained by the above method has a part working for enhancing the fluidity only in a molecular chain terminal part, and therefore an introducing amount of the long chain alkyl group is limited, so that the degree of a rise in the fluidity stays in such a level that it is not satisfactory.

A PC resin obtained by copolymerizing with octylene-bis (p-hydroxybenzoate) is proposed as a method for solving the above problem (refer to, for example, a Patent Document 2). The PC copolymer obtained by the above method provides no problems when a molding temperature is relatively low but involves the problem that gas is liable to be generated by decomposition when the molding temperature is elevated to 280° C. or higher in order to enhance the transferring property. Also, a PC resin obtained by copolymerizing with poly-tetramethylene glycol-bis(4-hydroxybenzoate) is disclosed (refer to, for example, a Patent Document 3), and it is known that this PC copolymer shows a high toughness, but the existing situation is that it is not technically established as a material showing excellent transferring property and molding property.

[Patent Document 1]

Japanese Patent Application Laid-Open No. 2003-96180

[Patent Document 2]

Japanese Patent Application Laid-Open No. Showa 61 (1986)-16923

[Patent Document 3]

Japanese Patent Application Laid-Open No. Showa 62 (1987)-79222

DISCLOSURE OF THE INVENTION

Problem to be Solved by the Invention

The present invention has been made in light of the circumstances described above, and an object thereof is to provide a copolycarbonate which can meet a wide range of molding conditions as a raw material since it is notably improved in a fluidity in molding and excellent in a heat stability and which results in providing good optical molded articles, a copolycarbonate composition, a polycarbonate base resin composition and an optical molded article comprising them.

Means for Solving the Problem

Intensive researches repeated by the present inventors in order to solve the problems described above have resulted in finding that the object described above can be achieved by a PC copolymer which has a specific amount of a specific repetitive unit and in which a viscosity number falls in a specific range. That is, it has been found that when the above PC copolymer is used as a material for an optical molded article, the luminance is enhanced because of the good transferring property and that the residual strain is small and the birefringence is reduced. The present invention has been completed based on such knowledge.

BRIEF DESCRIPTION OF THE DRAWING

The Drawing illustrates repetitive units, (I) and (II), found within a copolycarbonate.

That is, the present invention provides a copolycarbonate, a copolycarbonate composition, a polycarbonate base resin composition and an optical molded article comprising them each shown below.

1. A copolycarbonate comprising repetitive units represented by the following Formulas (I) and (II):

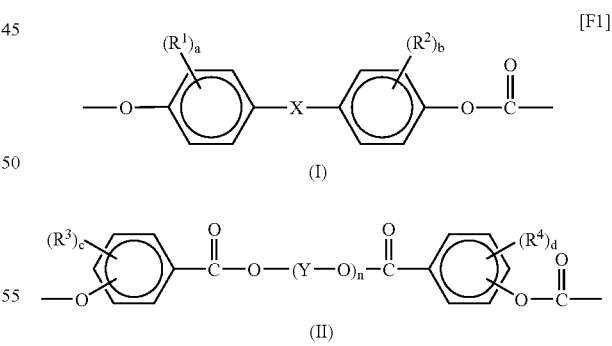

(wherein $R^1$ and $R^2$ each represent independently an alkyl group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— or a bond represented by the following Formula (III-1) or (III-2):

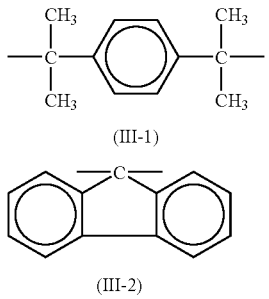

(III-1)

(III-2)

$R^3$ and $R^4$ each represent independently an alkyl group having 1 to 3 carbon atoms; Y represents a linear or branched alkylene group having 2 to 15 carbon atoms; a to d each are an integer of 0 to 4; and n is an integer of 2 to 450), wherein a content of the repetitive unit represented by Formula (II) described above is 1 to 30 mass %, and a viscosity number is 30 to 71.

2. The copolycarbonate as described in the above item 1, wherein in Formula (II), Y is at least one selected from —$CH_2$—$CH_2$—$CH_2$—$CH_2$—, —$CH_2$—$CH_2$—$CH_2$—CH($CH_3$)— and —$CH_2$—$CH_2$—$CH_2$—

3. The copolycarbonate as described in the above item 1 or 2, wherein the viscosity number is 37 to 62.

4. The copolycarbonate as described in any of the above items 1 to 3, wherein a flow value (Q value) at 280° C. is $30 \times 10^{-2}$ mL/s or more.

5. A copolycarbonate composition comprising the copolycarbonate as described in any of the above items 1 to 4 and other polycarbonate resins.

6. A polycarbonate base resin composition comprising (A) 100 mass parts of the copolycarbonate as described in any of the above items 1 to 4 or the copolycarbonate composition as described in the above item 5 and (B) 0.01 to 1 mass part of an acryl base resin having a molecular weight of 200 to 100,000.

7. The polycarbonate base resin composition as described in the above item 6, further comprising (C) 0.01 to 1 mass part of an alicyclic epoxy compound or (D) 0.01 to 3 mass parts of a polysiloxane compound having at least one selected from an alkoxy group, a vinyl group and a phenyl group.

8. An optical molded article comprising the copolycarbonate as described in any of the above items 1 to 4, the copolycarbonate composition as described in the above item 5 or the polycarbonate base resin composition as described in the above item 6 or 7.

9. An light guide plate comprising the copolycarbonate as described in any of the above items 1 to 4, the copolycarbonate composition as described in the above item 5 or the polycarbonate base resin composition as described in the above item 6 or 7.

10. A lens comprising the copolycarbonate as described in any of the above items 1 to 4, the copolycarbonate composition as described in the above item 5 or the polycarbonate base resin composition as described in the above item 6 or 7.

EFFECT OF THE INVENTION

According to the present invention, capable of being provided are a copolycarbonate providing an optical molded article which is improved in a luminance and reduced in a birefringence, a copolycarbonate composition and a polycarbonate base resin composition each comprising the same.

BEST MODE FOR CARRYING OUT THE INVENTION

The PC copolymer of the present invention is a phenol-modified diol copolymerized polycarbonate and can be produced by a conventional production method called an interfacial polymerization. That is, it can be produced by a method in which divalent phenol, phenol-modified diol and a carbonate precursor such as phosgene are reacted. To be specific, divalent phenol, phenol-modified diol and a carbonate precursor such as phosgene are reacted, for example, in an inactive solvent such as methylene chloride under the presence of a publicly known acid acceptor and molecular-weight-modifier and, if necessary, adding a catalyst and a branching agent.

The PC copolymer of the present invention can be obtained by copolymerizing divalent phenol described later with phenol-modified diol by an interfacial polymerization and comprises repetitive units represented by the following Formulas (I) and (II):

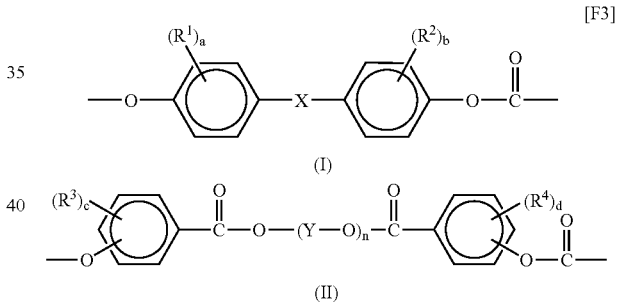

(wherein $R^1$ to $R^4$, X, Y, a to d and n shall be described later). A compound represented by the following Formula (Ia) can be given as the divalent phenol:

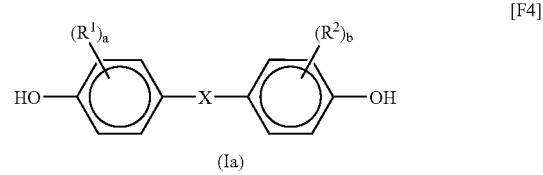

(Ia)

In Formula (Ia), $R^1$ and $R^2$ each represent independently an alkyl group having 1 to 6 carbon atoms, and may be a linear, a branched, or a cyclic alkyl group. To be specific, capable of being given as the alkyl group are methyl, ethyl, n-propyl, isopropyl, n-butyl, isobutyl, tert-butyl, n-pentyl, isopentyl, n-hexyl, isohexyl, cyclopentyl and cyclohexyl. The terms a and b each represent a substitution number of $R^1$ and $R^2$ and are an integer of 0 to 4. When plural $R^1$'s are present, plural R[1]'s may be the same as or different from each other, and when plural R[2]'s are present, plural R[2]'s may be the same as or different from each other.

X represents a single bond, an alkylene group having 1 to 8 carbon atoms (for example, methylene, ethylene, propylene, butylene, pentylene, hexylene and the like), an alkylidene group having 2 to 8 carbon atoms (for example, ethylidene, isopropylidene and the like), a cycloalkylene group having 5 to 15 carbon atoms (for example, cyclopentylene, cyclohexylene and the like), a cycloalkylidene group having 5 to 15 carbon atoms (for example, cyclopentylidene, cyclohexylidene and the like), —S—, —SO—, —SO$_2$—, —O—, —CO— bonds or a bond represented by the following Formula (III-1) or (III-2):

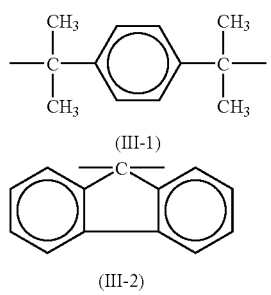

[F5]

(III-1)

(III-2)

Various compounds are available as the divalent phenol represented by Formula (Ia), and 2,2-bis(4-hydroxyphenyl)propane (commonly called bisphenol A) is particularly suited. Bisphenols other than bisphenol A include, for example, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-3-methylphenyl)propane, bis(4-hydroxylphenyl)naphthylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane and 2,2-bis(4-hydroxy-3,5-tetrabromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane and 2,2'-bis(4-hydroxyphenyl)norbornene; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; bis(4-hydroxyphenyl)diphenylmethane; dihydroxydiaryladamantanes such as 1,3-bis(4-hydroxyphenyl)adamantane, 2,2-bis(4-hydroxyphenyl)adamantane and 1,3-bis(4-hydroxyphenyl)-5,7-dimethyladamantane; bis(4-hydroxyphenyl)diphenylmethane; 4,4'-[1,3-phenylenebis(1-methylethylidene)]bisphenol; 10,10-bis(4-hydroxyphenyl)-9-anthrone; 1,5-bis(4-hydroxyphenylthio)-2,3-dioxapentaene; and α, ω-bishydroxyphenylpolydimethylsiloxane compounds. The above divalent phenols each may be used alone or in a mixture of two or more kinds thereof.

Usually, various compounds can be used as the molecular-weight-modifier as long as they are used for polymerization of PC resins. To be specific, monovalent phenols include, for example, phenol o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkylphenols having a linear or branched alkyl group having an average carbon number of 12 to 35 at an ortho-position, a meta-position or a para-position, 9-(4-hydroxyphenyl)-9-(4-methoxyphenyl)fluorene, 9-(4-hydroxy-3-methylphenyl)-9-(4-methoxy-3-methylphenyl)fluorene and 4-(1-adamantyl)phenol. Among the above monovalent phenols, p-t-butylphenol, p-cumylphenol and p-phenylphenol are preferably used.

Phase transfer catalysts, for example, tertiary amines and salts thereof, quaternary ammonium salts and quaternary phosphonium salts can preferably be used as the catalyst. The tertiary amines include, for example, triethylamine, tributylamine, N,N-dimethylcyclohexylamine, pyridine and dimethylaniline, and the tertiary amine salts include, for example, hydrochlorides and hydrobromides of the above tertiary amines. The quaternary ammonium salts include, for example, trimethylbenzylammonium chloride, triethylbenzylammonium chloride, tributylbenzylammonium chloride, trioctylmethylammonium chloride, tetrabutylammonium chloride and tetrabutylammonium bromide, and the quaternary phosphonium salts include, for example, tetrabutylphosphonium chloride and tetrabutylphosphonium bromide. The above catalysts each may be used alone or in combination of two or more kinds thereof. Among the catalysts described above, the tertiary amines are preferred, and triethylamine is suited.

The inactive organic solvent includes various solvents. It includes, for example, chlorinated hydrocarbons such as dichloromethane (methylene chloride), trichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane and chlorobenzene, toluene and acetophenone. The above organic solvents each may be used alone or in combination of two or more kinds thereof. Among them, methylene chloride is particularly suited.

Capable of being used as the branching agent are, for example, compounds having three or more functional groups such as 1,1,1-tris(4-hydroxyphenyl)ethane, 4,4'-[1-[4-[1-(4-hydroxyphenyl)-1-methylethyl]phenyl]ethylidene]-bisphenol, α,α',α"-tris(4-hydroxyphenyl)-1,3,5-triisopropylbenzene, 1-[α-methyl-α-(4'-hydroxyphenyl)ethyl]-4-[α', α'-bis(4"-hydroxyphenyl)ethyl]benzene, fluoroglycine, trimellitic acid and isatinbis(o-cresol).

The phenol-modified diol used in the present invention is a compound represented by the following Formula (IIa):

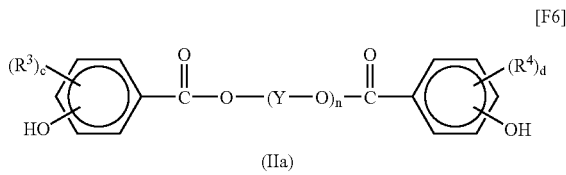

[F6]

(IIa)

wherein $R^3$ and $R^4$ each represent independently an alkyl group having 1 to 3 carbon atoms; Y represents a linear or branched alkylene group having 2 to 15 carbon atoms; c and d are an integer of 0 to 4; and n is an integer of 2 to 450. The alkyl group represented by $R^3$ and $R^4$ includes methyl, ethyl, n-propyl and isopropyl. When plural $R^3$'s are present, plural $R^3$'s may be the same as or different from each other, and when plural $R^4$'s are present, plural $R^4$'s may be the same as or different from each other. The linear or branched alkylene group having 2 to 15 carbon atoms represented by Y includes alkylene groups such as ethylene, propylene, butylene, isobutylene, pentylene and isopentylene and alkylidene residues such as ethylidene, propylidene, isopropylidene, butylidene, isobutylidene, pentylidene and isopentylidene. The term n is preferably 2 to 200, more preferably 6 to 70.

The phenol-modified diol represented by Formula (IIa) described above is a compound derived from benzoic acid or an alkyl ester thereof, acid chloride and polyetherdiol. The phenol-modified diol can be synthesized by methods proposed in Japanese Patent Application Laid-Open No. Showa 62 (1987)-79222, Japanese Patent Application Laid-Open No. Showa 60 (1985)-79072 and Japanese Patent Application Laid-Open No. 2002-173465, and the phenol-modified diols obtained by the above methods are preferably subjected to suitable refining. The refining method is preferably, for example, a method in which pressure in the system is reduced at a latter step of the reaction to distil off excess raw materials (for example, parahydroxybenzoic acid) and a method in which the phenol-modified diol is washed with water or an alkaline aqueous solution (for example, a sodium hydrogencarbonate aqueous solution).

Methyl hydroxybenzoate and ethyl hydroxybenzoate are the representative examples of alkyl hydroxybenzoate. The polyetherdiol is represented by HO—$(Y—O)_n$—H and comprises repeat of linear or branched alkyl ether having 2 to 15 carbon atoms. To be specific, it includes polyethylene glycol, polypropylene glycol and polytetramethylene glycol. Polytetramethylene glycol is particularly preferred from the viewpoints of availability and hydrophobicity. A repeating number n of an ether part in the polyetherdiol is 2 to 200, preferably 6 to 70. If n is 2 or more, an efficiency in copolymerizing with the phenol-modified diol is good, and if n is 70 or less, provided is the advantage that the PC copolymer is less reduced in a heat resistance.

The representative example of the acid chloride is a compound obtained from hydroxybenzoic acid and phosgene. To be more specific, it can be obtained by a method described in U.S. Pat. No. 2,652,707. Hydroxybenzoic acid or an alkyl ester thereof may be any of a para compound, a meta compound and an ortho compound, and the para compound is preferred in terms of the copolymerization reaction. The ortho compound is likely to be inferior in a reactivity of the copolymerization due to steric hindrance to a hydroxyl group.

In the production step of the PC copolymer, the phenol-modified diol is used preferably in the form of a methylene chloride solution as much as possible in order to prevent it from being deteriorated. When it can not be used in the form of a methylene chloride solution, it can be used in the form of an alkaline aqueous solution of NaOH and the like.

If a copolymerization amount of the phenol-modified diol in the PC copolymer is increased, the fluidity is improved, but the heat resistance is reduced. Accordingly, a copolymerization amount of the phenol-modified diol is selected preferably according to a balance between the desired fluidity and heat resistance. If a copolymerization amount of the phenol-modified diol exceeds 40 mass %, the PC copolymer assumes an elastomer form as shown in Japanese Patent Application Laid-Open No. Showa 62 (1987)-79222, and it is likely not to be applicable to the same uses as those of conventional PC resins. In order to maintain a heat resistance of 100° C. or higher, an amount of a phenol-modified diol residue contained in the PC copolymer has to be 1 to 30 mass % in the present invention, and it is preferably 1 to 20 mass %, more preferably 1 to 15 mass %.

A viscosity number of the PC copolymer of the present invention has to be 30 to 71 (corresponding to Mv (viscosity average molecular weight)=10,000 to 28,100), and it is preferably 37 to 62 (corresponding to Mv=13,100 to 24,100). The same shall apply in the PC copolymer composition and the PC base resin composition each described later. If the viscosity number is 30 or more, the mechanical properties are good, and if the viscosity number is 70 or less, the copolymerization effect of the comonomer is exhibited well. If intending to reveal the high fluidity, a large amount of the comonomer is required, but if the viscosity number is 71 or less, the heat resistance is not reduced to a large extent in proportion to use of the comonomer. The viscosity number is a value measured based on ISO 1628-4 (1999).

A flow value (Q value) of the PC copolymer of the present invention at 280° C. is preferably $30 \times 10^{-2}$ mL/s or more, more preferably $40 \times 10^{-2}$ mL/s or more. The flow value (Q value) is a melt viscosity measured by means of an overhead type flow tester based on JIS K7210, and if the flow value (Q value) is $30 \times 10^{-2}$ mL/s or more, a melt viscosity of the PC copolymer is not elevated too high. The same shall apply in the PC copolymer composition and the PC base resin composition each described later.

The PC copolymer of present invention can be used as it is for a material of various optical molded articles, and it may be used in the form of a PC copolymer composition obtained by mixing the PC copolymer of present invention with other PC resins. When the above PC copolymer and PC copolymer composition are used for light guide plates and optical lenses, they are preferably blended with (B) an acryl base resin having a molecular weight of 200 to 100,000 for the purpose of enhancing the light transmission factor, and they are used more preferably in the form of a PC base resin composition obtained by blending with (C) an alicyclic epoxy compound or (D) a polysiloxane compound having at least one selected from an alkoxy group, a vinyl group and a phenyl group in addition to the above component (B).

Commercially available PC resins can be used as the other PC resins blended with the PC copolymer of present invention. A blend amount of the other PC resins is preferably 300 mass parts or less, more preferably 10 to 200 mass parts based on 100 mass parts of the PC copolymer from the viewpoint that the effects of present invention are not damaged.

The acryl base resin of the component (B) means a polymer comprising at least one selected from monomer units of acrylic acid, an acrylic acid ester, acrylonitrile and derivatives thereof as a repetitive unit, and it means a homopolymer or a copolymer with styrene, butadiene and the like. To be specific, it includes polyacrylic acid, polymethyl methacrylate (PMMA), polyacrylonitrile, ethyl acrylate-2-chloroethyl acrylate copolymers, n-butyl acrylate-acrylonitrile copolymers, acrylonitrile-styrene copolymers, acrylonitrile-butadiene copolymers and acrylonitrile-butadiene-styrene copolymers. Among them, polymethyl methacrylate (PMMA) can particularly suitably be used.

The acryl base resin of the component (B) has to have a molecular weight of 200 to 100,000, and it is preferably 20,000 to 60,000. If the molecular weight is 200 to 100,000, phase separation of the PC copolymer and the other PC resin from the acryl base resin is not accelerated too much in molding, and therefore a satisfactory transparency is obtained in a molded article. Publicly known products can be used as polymethyl methacrylate (PMMA), and usually preferred are products produced by subjecting a methyl methacrylate monomer to bulk polymerization in the presence of a polymerization initiator of peroxide and an azo base.

A blend amount of the acryl base resin is usually 0.01 to 1 mass part, preferably 0.05 to 0.5 mass part and more preferably 0.1 to 0.3 mass part based on 100 mass parts of (A) the PC copolymer of present invention or the PC copolymer composition obtained by mixing the PC copolymer of present invention with the other PC resins. If a blend amount of the acryl base resin is 0.01 mass part or more, a transparency of the molded article is enhanced, and if it is 1 mass part or less, the transparency can be maintained without damaging the other desired physical properties.

The alicyclic epoxy compound of the component (C) described above means a cyclic aliphatic compound having an alicyclic epoxy group, that is, an epoxy group in which one oxygen atom is added to an ethylene bond in an aliphatic ring, and to be specific, suitably used are compounds represented by the following Formulas (1) to (10) shown in Japanese Patent Application Laid-Open No. Heiseil (1999)-158364:

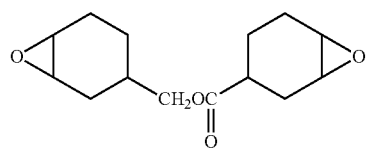

[F7]

(1)

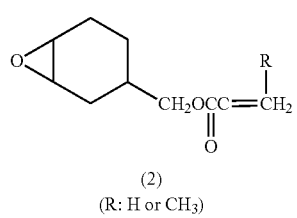

[F8]

(2)
(R: H or CH₃)

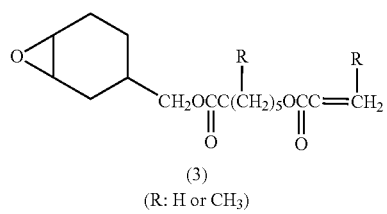

[F9]

(3)
(R: H or CH₃)

-continued

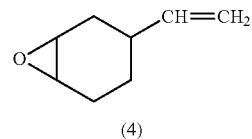

[F10]

(4)

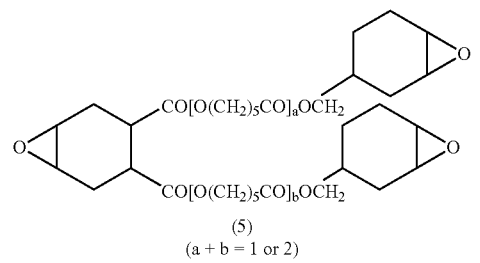

[F11]

(5)
(a + b = 1 or 2)

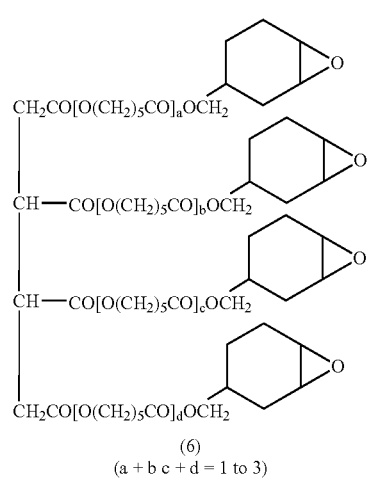

[F12]

(6)
(a + b + c + d = 1 to 3)

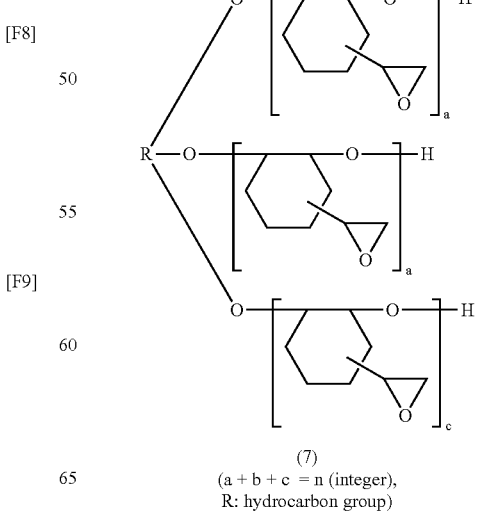

[F13]

(7)
(a + b + c = n (integer),
R: hydrocarbon group)

-continued

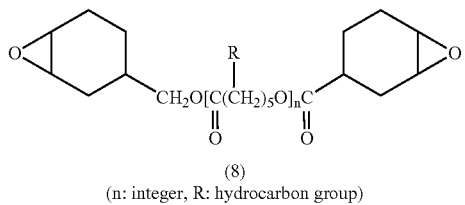

(8)
(n: integer, R: hydrocarbon group)

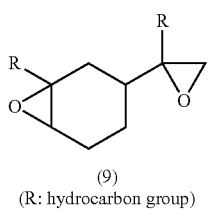

(9)
(R: hydrocarbon group)

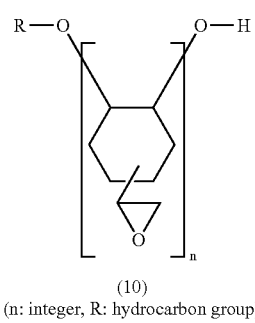

(10)
(n: integer, R: hydrocarbon group)

Among the alicyclic epoxy compounds described above, the compound represented by Formula (1), Formula (7) or Formula (10) is preferably used from the viewpoints that it is excellent in a compatibility with the PC base resin and that it does not damage the transparency. Blending of the component (A) described above with the alicyclic epoxy compound makes it possible to enhance the transparency and makes it possible as well to enhance the hydrolysis resistance.

A blend amount of the alicyclic epoxy compound of the component (C) is usually 0.01 to 1 mass part, preferably 0.02 to 0.2 mass part based on 100 mass parts of the component (A). The addition effect is obtained by controlling the above blend amount to 0.01 mass part or more, and the transparency is obtained without expediting phase separation by controlling it to 1 mass part or less.

The polysiloxane compound of the component (D) described above is a reactive silicone base compound obtained by introducing at least one functional group selected from an alkoxy group (for example, methoxy and ethoxy), a vinyl group and a phenyl group into a silicone base compound, and it includes organopolysiloxane. The above component (D) is a compound which acts as a stabilizer in the PC base resin, and blending of the component (D) makes it possible to prevent yellowing caused by heat deterioration in molding, inferior appearance such as silver (silver streaks) and mixing of air bubbles. A blend amount of the component (D) is suitably selected from a range of usually 0.01 to 3 mass parts, preferably 0.05 to 2 mass parts based on 100 mass parts of the component (A). If it is 0.01 mass part or more, the effects of addition are exhibited, and if it is 3 mass parts or less, cloudiness is not brought about on the molded article.

The PC copolymer, the PC copolymer composition and the PC base resin composition according to the present invention may be blended, if necessary, with various additives in addition to the respective components described above as long as the effects of the present invention are not damaged. The various additives include, for example, antioxidants of an arylphosphines base, a phosphorous acid ester base, a phosphoric acid ester base and a hindered phenol base, UV absorbers of a benzotriazole base and a benzophenone base, light stabilizers of a hindered amine base, internal lubricants such as aliphatic carboxylic acid ester base compounds, paraffin base compounds, silicone oils and polyethylene waxes, conventional flame retardants, flame retardant auxiliary agents, mold releasing agents, antistatic agents, colorants and the like.

EXAMPLES

Next, the present invention shall be explained in further details with reference to examples, but the present invention shall by no means be restricted by these examples.

Production Example 1

Synthesis of polytetramethylene glycol bis(4-hydroxybenzoate)

Polytetramethylene glycol (PTMG, Mn (number average molecular weight)=1000) 100 mass parts and methyl p-hydroxybenzoate 33.4 mass parts were heated at 220° C. under nitrogen atmosphere in the presence of dibutyltin oxide 0.5 mass part to distill methanol off.

Pressure in the reaction system was reduced to distil off excess methyl p-hydroxybenzoate. The reaction product 5.0 mass parts was dissolved in methylene chloride 30 volume parts. A 8 mass % sodium hydrogencarbonate aqueous solution 10 volume parts was added to the above methylene chloride solution. The mixture was vigorously stirred for 20 minutes, and then a methylene chloride phase was obtained by centrifugal separation. The methylene chloride phase was concentrated under reduced pressure to obtain polytetramethylene glycol bis(4-hydroxybenzoate) which was phenol-modified diol. p-Hydroxybenzoic acid and methyl p-hydroxybenzoate contained in polytetramethylene glycol bis(4-hydroxybenzoate) were determined by HPLC (high performance liquid chromatography) according to the following method to result in finding that less than 10 mass ppm of p-hydroxybenzoic acid and 0.2 mass % of methyl p-hydroxybenzoate were contained therein.

<Determination of p-Hydroxybenzoic Acid and Methyl p-Hydroxybenzoate>

Determination was carried out by HPLC (high performance liquid chromatography) on the following conditions based on a calibration curve prepared using a standard product.

Column: ODS-3 manufactured by GL Science Co., Ltd.

Column temperature: 40° C.

Solvent: volume ratio 1:2 mixed solution of a 0.5 mass % phosphoric acid aqueous solution and acetonitrile Flow velocity: 1.0 mL/minute Production Examples 2 to 4

Synthesis of polytetramethylene glycol bis(4-hydroxybenzoate)

Polytetramethylene glycol bis(4-hydroxybenzoate) was obtained in the same manner as in Production Example 1, except that polytetramethylene glycol (Mn=600) (Production Example 2), polytetramethylene glycol (Mn=2000) (Production Example 3) and polytetramethylene glycol (Mn=2900) (Production Example 4) were used in place of polytetramethylene glycol (Mn=1000).

Example 1

Production of PC Copolymer (1) Synthetic Step of PC Oligomer

Sodium dithionite of 2000 mass ppm based on bisphenol A (BPA) which was dissolved later was added to a sodium hydroxide aqueous solution having a concentration of 5.6 mass %, and BPA was dissolved therein so that a BPA concentration was 13.5 mass % to prepare a sodium hydroxide aqueous solution of BPA. The sodium hydroxide aqueous solution of BPA described above and methylene chloride were allowed to continuously pass through a tubular reactor having an inner diameter of 6 mm and a tube length of 30 m at the flow velocities of 40 L/hr and 15 L/hr respectively, and phosgene was allowed to continuously pass at the same time at a flow velocity of 4.0 kg/hr. The tubular reactor has a jacket part, and cooling water was allowed to pass through the jacket to maintain a temperature of the reaction liquid at 40° C. or lower.

The reaction liquid discharged from the tubular reactor was continuously introduced into a baffle-installed bath type reactor equipped with a sweepback wing and having a content volume of 40 L, and a sodium hydroxide aqueous solution of BPA, a 25 mass % sodium hydroxide aqueous solution, water and a 1 mass % triethylamine aqueous solution were further supplied thereto at the flow velocities of 28 L/hr, 0.07 L/hr, 17 L/hr and 0.64 L/hr respectively to carry out reaction at 29 to 32° C. The reaction liquid was continuously drawn out from the bath type reactor and left standing still, whereby an aqueous phase was separated and removed to obtain a methylene chloride phase. The polycarbonate oligomer solution thus obtained had an oligomer concentration of 329 g/L and a chloroformate group concentration of 74 mol/L.

(2) Polymerization Step of PC Copolymer

A bath type reactor equipped with a baffle plate and a paddle type stirring blade and having a content volume of 50 L was charged with 7.5 L of the oligomer solution described above, 4.7 L of methylene chloride, 136 g of polytetramethylene glycol bis(4-hydroxybenzoate) (Mn of a PTMG chain=600) obtained in Production Example 2 and 4.4 mL of triethylamine, and 1389 g of a 6.4 mass % sodium hydroxide aqueous solution was added thereto under stirring to react the PC oligomer with polytetramethylene glycol bis(4-hydroxybenzoate) for 10 minutes. Then, added thereto were a methylene chloride solution of p-tert-butylphenol (PTBP) (prepared by dissolving 92.9 g of PTBP in 0.3 L of methylene chloride) and a sodium hydroxide aqueous solution of BPA (prepared by dissolving 443 g of BPA in an aqueous solution obtained by dissolving 266 g of NaOH and 0.9 g of sodium dithionite in 3.9 L of water), and polymerization reaction was carried out for 30 minutes. After adding 30 L of methylene chloride for dilution and stirring for 10 minutes, the solution was separated into an organic phase containing the PC copolymer and an aqueous phase containing excess BPA and NaOH, and the organic phase was isolated.

The methylene chloride solution of the PC copolymer thus obtained was washed in order with a 0.03 mol/L sodium hydroxide aqueous solution of an amount corresponding to 15 volume % of the above solution and 0.2 mol/L hydrochloric acid, and then it was repeatedly washed with purified water until an electric conductivity of the aqueous phase after washing reached 0.01 μS/m or less. The methylene chloride solution of the PC copolymer obtained by washing was concentrated and crushed, and the resulting flakes were dried under reduced pressure at 100° C. An amount of a polytetramethylene glycol bis(4-hydroxybenzoate) residue determined by NMR was 4.5 mass %.

The PC copolymer thus obtained was measured for a viscosity number, a copolymerization amount, a glass transition temperature Tg and a flow value (Q value) by the following methods. The results thereof are shown in Table 1.

(1) Measurement of Viscosity Number (VN)

Measured based on ISO 1628-4 (1999).

(2) Measurement of Copolymerization Amount (Content)

$^1$H-NMR of the copolymer was measured, and the respective protons (underlined parts) were relegated as follows:

$\delta$1.4-1.9: C$\underline{H}_3$ of BPA, —O—CH$_2$—C$\underline{H}_2$—C$\underline{H}_2$—CH$_2$—

$\delta$3.3-3.5: —O—C$\underline{H}_2$—CH$_2$—CH$_2$—C$\underline{H}_2$—

$\delta$4.3-4.4: —CO—O—C$\underline{H}_2$—CH$_2$—CH$_2$—CH$_2$—

A mole ratio of the phenol-modified diol carbonate part represented by Formula (II) described above to the BPA carbonate part represented by Formula (I) described above was calculated from the respective integrated values, and then it was converted to a mass to calculate the copolymerization amount. The calculation example thereof shall be shown below.

Calculation Example

In a case where an integrated value of $\delta$ 1.4–1.9 is 858.6, where an integrated value of $\delta$ 3.3–3.5 is 118.7 and where an integrated value of $\delta$ 4.3–4.4 is 10.21, repeating number n=118.7÷10.21=12.6

BPA=[(858.6-118.7-10.21)/6]=121.6 phenol-modified diol=(10.21/4)=2.55

A mole ratio of the BPA carbonate part is 97.9 mol % according to the following calculation:

[(858.6-118.7-10.21)/6]/{(10.21/4)+[(858.6-118.7-10.21)/6]}×100=97.9mol %

A mole ratio of the phenol-modified diol carbonate part is 2.05 mol % according to the following calculation:

(10.21/4)/{(10.21/4)+[(858.6-118.7-10.21)/6]}×100=2.05mol %

Accordingly, a copolymerization amount (mass %) of the phenol-modified diol carbonate part is 8.9 mass % according to the following equation:

2.05×(136+120+12.6×72+12+16)÷(2.05×(136+120+12.6×72+12+16)+97.9×254)×100=8.9 mass %

(3) Measurement of Glass Transition Temperature Tg
Measured based on ISO 11357.

(4) Measurement of Flow Value (Q Value)

A melt resin amount (mL/sec) flowing out from a nozzle having a diameter of 1 mm and a length of 10 mm at 280° C. and a pressure of 15.7 MPa was measured by means of an overhead type flow tester based on JIS K7210. The flow value (Q value) is increased as the melt viscosity is reduced.

Examples 2 to 7

PC copolymers were obtained in the same manner as in Example 1, except that in Example 1, the kind and an addition amount of polytetramethylene glycol bis(4-hydroxybenzoate) and an addition amount of PTBP were changed as shown in Table 1. The PC copolymers thus obtained were measured for a viscosity number, a copolymerization amount, a glass transition temperature Tg and a flow value (Q value) in the same manners as in Example 1. The results thereof are shown in Table 1.

TABLE 1

| | Example | | | | | | |
|---|---|---|---|---|---|---|---|
| | 1 | 2 | 3 | 4 | 5 | 6 | 7 |
| Mn of raw material PTMG | 600 | 1000 | 1000 | 1000 | 2000 | 2000 | 2900 |
| Addition amount (g) of phenol-modified diol | 136 | 191 | 273 | 382 | 136 | 273 | 273 |
| Addition amount (g) of PTBP | 92.9 | 95.6 | 92.9 | 92.9 | 94.7 | 69.7 | 86.5 |
| Viscosity number | 39.6 | 38.9 | 39.6 | 39.6 | 39.2 | 47.6 | 41.5 |
| Tg (° C.) | 127 | 116 | 112 | 102 | 125 | 108 | 111 |
| Copolymerization amount (content) [mass %] of phenol-modified diol | 4.5 | 6.4 | 8.9 | 12.7 | 4.5 | 9.2 | 9.0 |
| Q value (×10$^{-2}$ mL/s) | 69 | 101 | 126 | 130< | 64 | 64 | 115 |

Example 8

The PC copolymer 70.0 mass parts obtained in Example 7 and Tarflon FN1500 (brand name, Bis-A polycarbonate, VN=39.5, manufactured by Idemitsu Petrochemical Co., Ltd.) 30.0 mass parts were blended with Adeka Stab PEP36 (brand name, phosphorous base antioxidant, manufactured by Asahi Denka Co., Ltd.) mass part, and the mixture was granulated at a resin temperature of 250° C. by means of an extruding machine of 40 mmφ equipped with a vent to obtain pellets. The pellets thus obtained were measured for a viscosity number, a copolymerization amount, a glass transition temperature Tg and a flow value (Q value) in the same manners as in Example 1. The results thereof are shown in Table 2.

Example 9

The PC copolymer 69.8 mass parts obtained in Example 3 and Tarflon FN1500 (brand name, Bis-A polycarbonate, VN=39.5, manufactured by Idemitsu Petrochemical Co., Ltd.) 29.9 mass parts were blended with Dianal BR83 (brand name, acryl base resin, molecular weight: 40,000, manufactured by Mitsubishi Rayon Co., Ltd.) 0.1 mass part, KR511 (brand name, organopolysiloxane having a methoxy group and a vinyl group, manufactured by Shin-etsu Silicone Co., Ltd.) 0.1 mass part, Celoxide 2021P (brand name, alicyclic epoxy compound, manufactured by Daicel Chemical Industries Ltd.) 0.05 mass part and Adeka Stab PEP36 (brand name, phosphorous base antioxidant, manufactured by Asahi Denka Co., Ltd.) 0.05 mass part, and the mixture was granulated at a resin temperature of 260° C. by means of an extruding machine of 40 mmφ equipped with a vent to obtain pellets. The pellets thus obtained were measured for a viscosity number, a copolymerization amount, a glass transition temperature Tg and a flow value (Q value) in the same manners as in Example 1. The results thereof are shown in Table 2.

TABLE 2

| Blend component (mass part) | | Example 8 | Example 9 |
|---|---|---|---|
| PC copolymer | Kind | Example 7 | Example 3 |
| | Blend amount | 70.0 | 69.8 |
| Tarflon FN1500 | | 30.0 | 29.9 |
| Dianal BR83 | | — | 0.1 |
| KR511 | | — | 0.1 |
| Celoxide 2021P | | — | 0.05 |
| Adeka Stab PEP36 | | 0.05 | 0.05 |
| Viscosity number | | 41.0 | 39.6 |
| Tg (° C.) | | 119 | 120 |

TABLE 2-continued

| Copolymerization amount (content) [mass %] of phenol-modified diol | 6.3 | 6.3 |
|---|---|---|
| Q value (×10$^{-2}$ mL/s) | 83 | 90 |

Comparative Example 1

A bath type reactor equipped with a baffle plate and a paddle type stirring blade and having a content volume of 1 L was charged with 137 mL of the PC oligomer solution obtained in Example 1 (1), 35 g of polytetramethylene glycol bis(4-hydroxybenzoate) (Mn of a PTMG chain=2900) obtained in Production Example 4 and 85 μL of triethylamine, and 38.0 g of a 6.4 mass % sodium hydroxide aqueous solution was added thereto under stirring to carry out reaction for 10 minutes. Then, added thereto were a methylene chloride solution of PTBP (prepared by dissolving 0.53 g of PTBP in 10 mL of methylene chloride) and a sodium hydroxide aqueous solution of BPA (prepared by dissolving 3.92 g of BPA in an aqueous solution obtained by dissolving 3.80 g of NaOH and 8 mg of sodium dithionite in 55 mL of water), and polymerization reaction was carried out for 50 minutes.

Methylene chloride 100 mL was added thereto for dilution, stirred for 10 minutes and left standing still to separate the solution into an organic phase containing the PC copolymer and an aqueous phase containing excess BPA and NaOH, and the organic phase was isolated.

The methylene chloride solution of the PC copolymer thus obtained was washed in order with a 0.03 mol/L sodium hydroxide aqueous solution of an amount corresponding to 15 volume % of the above solution and 0.2 mol/L hydrochloric acid, and then it was repeatedly washed with purified water until an electric conductivity of the aqueous phase after washing reached 0.01 μS/m or less. The methylene chloride solution of the PC copolymer obtained by washing was concentrated and dried, whereby a polymer solid matter was obtained. The polymer thus obtained had a soft and rubber-like touch feeling (elastomer property). An amount of a polytetramethylene glycol bis(4-hydroxybenzoate) residue determined by NMR was 42 mass %, and Tg was −30° C. or lower.

Example 10

The PC copolymer 100 mass parts obtained in Example 1 was blended with Adeka Stab PEP36 (brand name, phosphorous base antioxidant, manufactured by Asahi Denka Co., Ltd.) 0.05 mass part, and the mixture was granulated at a resin temperature of 250° C. by means of an extruding machine of 40 mmϕ equipped with a vent to obtain pellets.

A die for a convex lens having a lens diameter of 20 mm and a lens minimum thickness of 2.0 mm was used to injection-mold the pellets obtained, whereby a lens was molded. The molding conditions were set to a resin temperature of 260° C. and a hold pressure of 160 MPa. The lens thus obtained was not observed to be optically colored over a whole part in a region within a radius of 9 mm in the central part of the lens in a strain evaluation method (a strain detector manufactured by Heidon Co., Ltd. was used to carry out judgment with naked eyes through a transmission window of the strain detector by an orthogonal nicol method).

A molded article of 25×30×3.0 mm was prepared separately from the pellets described above, and a whole light transmission factor was measured to result in finding that it was 90.5%.

Example 11

A convex lens was molded on the same conditions as in Example 10, except that the pellets obtained in Example 8 were used. The lens thus obtained was not observed to be optically colored over a whole part in a region within a radius of 9 mm in the central part of the lens in judgment by the same strain evaluation method as in Example 10.

A molded article of 25×30×3.0 mm was prepared separately from the pellets described above, and a whole light transmission factor was measured to result in finding that it was 82.4%.

Reference Example 1

Tarflon FN1500 (brand name, Bis-A polycarbonate, VN=39.5, manufactured by Idemitsu Petrochemical Co., Ltd.) was blended with Adeka Stab PEP36 (brand name, phosphorous base antioxidant, manufactured by Asahi Denka Co., Ltd.) 0.05 mass part, and the mixture was granulated at a resin temperature of 250° C. by means of an extruding machine of 40 mmϕ equipped with a vent to obtain pellets.

The pellets thus obtained were used to mold a lens using the same mold and injection molding machine as in Example 10. The resin temperature was changed to 260° C., 270° C. and 280° C. on the condition of a hold pressure of 160 MPa to carry out molding. As a result thereof, dense coloring was shown at a resin temperature of 260° C. in a region within a radius of 9 mm in the central part in judgment by the same strain evaluation method as in Example 10, and a lens in which optical coloring was not observed to the same extent as in Example 10 was not obtained. The resin temperature was changed to 280° C., and a lens in which optical coloring was not observed to the same extent as in Example 10 in judgment by the strain evaluation method described above could be obtained.

It can be found from the results described above that use of the PC copolymer of the present invention makes it possible to obtain a lens molded article having less optical strain and in addition thereto, makes it possible to relax the molding conditions. Accordingly, time in molding cycle is expected to be shortened.

A molded article of 25×30×3.0 mm was prepared separately from the pellets described above, and a whole light transmission factor was measured to result in finding that it was 90.0%.

Examples 12 to 15 and Comparative Examples 2 and 3

The PC copolymers obtained in Examples 2 and 5 and Tarflon FN1500 (brand name, Bis-A polycarbonate, VN=39.5, manufactured by Idemitsu Petrochemical Co., Ltd.) 30.0 mass parts were blended respectively with Adeka Stab PEP36 (brand name, phosphorous base antioxidant, manufactured by Asahi Denka Co., Ltd.) 0.05 mass part, and the mixtures were granulated at a resin temperature of 250° C. by means of an extruding machine of 40 mmϕ equipped with a vent to obtain pellets.

A die for a concave lens having a lens diameter of 77 mm and a lens minimum thickness of 1.4 mm was used to subject the pellets obtained to injection compression molding, whereby a lens was prepared. An injection molding machine use was set to a mold clamping force of 980 kN, a resin temperature of 270° C. or 250° C. and a die temperature of 120° C., 100° C. or 80° C. A strain of the lenses was evaluated by a strain evaluation method described below. The evaluation results thereof are shown in Table 3.

<Strain Evaluation Method>

A strain detector manufactured by Heidon Co., Ltd. was used to carry out judgment with naked eyes through a transmission window of the strain detector by an orthogonal nicol method. In the judge criteria, a lens having markedly dense coloring over a whole part in a region within a radius of 35 mm in the central part of the lens was marked with [X], and a lens which was not observed to be optically colored was marked with [○].

TABLE 3

|  | Comparative Example 2 | Example 12 | Example 13 | Comparative Example 3 | Example 14 | Example 15 |
| --- | --- | --- | --- | --- | --- | --- |
| Raw material polycarbonate resin | FN1500 | Example 2 | Example 5 | FN1500 | Example 2 | Example 5 |
| Resin temperature (° C.) | 270 | 250 | 250 | 250 | 250 | 250 |

TABLE 3-continued

|  | Comparative Example 2 | Example 12 | Example 13 | Comparative Example 3 | Example 14 | Example 15 |
|---|---|---|---|---|---|---|
| Die temperature (° C.) | 120 | 100 | 100 | 100 | 80 | 80 |
| Strain evaluation result | X | ○ | ○ | * | ○ | ○ |

*: inferior transfer was caused in a lens central part, and the resin was not sufficiently filled into the die.

Thus, use of the PC copolymer of the present invention made it possible not only to enhance a transferring property into a mold but also to prepare a lens in which optical strain is effectively inhibited from being produced.

Example 16

A die (35 mm×45 mm, a gate side thickness=0.8 mm, a thickness of a side opposite to the gate side=0.6 mm) for an light guide plate was used to subject the pellets obtained in Example 9 to injection compression molding, whereby an light guide plate was prepared. The resin temperature was 280° C., and the die temperature was 100° C.

A molded article of 25×30×3.0 mm was prepared separately from the pellets described above, and a whole light transmission factor was measured to result in finding that it was 92.0%.

Comparative Example 4

Blended were Tarflon FN1500 (brand name, Bis-A polycarbonate, VN=39.5, manufactured by Idemitsu Petrochemical Co., Ltd.) 99.7 mass parts, Dianal BR83 (brand name, acryl base resin, molecular weight: 40,000, manufactured by Mitsubishi Rayon Co., Ltd.) 0.1 mass part, KR511 (brand name, organopolysiloxane having a methoxy group and a vinyl group, manufactured by Shin-etsu Silicone Co., Ltd.) 0.1 mass part, Celoxide 2021P (brand name, alicyclic epoxy compound, manufactured by Daicel Chemical Industries Ltd.) 0.05 mass part and Adeka Stab PEP36 (brand name, phosphorous base antioxidant, manufactured by Asahi Denka Co., Ltd.) 0.05 mass part, and the mixture was granulated at a resin temperature of 260° C. by means of an extruding machine of 40 mmϕ equipped with a vent to obtain pellets. The pellets thus obtained were used to prepare an light guide plate in the same manner as in Example 16.

A molded article of 25×30×3.0 mm was prepared separately from the pellets described above, and a whole light transmission factor was measured to result in finding that it was 91.5%.

Unevenness on the prisms of the light guide plates obtained in Example 16 and Comparative Example 4 was measured by means of a scanning type laser microscope (SLM70, manufactured by Lasertec Co., Ltd.). When a height of unevenness on the prism of the light guide plate obtained in Example 16 was set to 100, a height of unevenness on the prism of the light guide plate obtained in Comparative Example 4 was 90.

Further, the respective light guide plates were evaluated by the strain evaluation method described above, and as a result thereof, the light guide plate obtained in Example 16 was not observed to be optically colored in an area of 70% thereof. In contrast with this, an area in which optical coloring was not observed was 30% in the light guide plate obtained in Comparative Example 4.

As can be found from the above, the PC copolymers of the present invention have a molding property and a transparency which are suited for obtaining optical molded articles in contrast with conventionally known polytetramethylene glycol bis(4-hydroxybenzoate)-copolymerized polycarbonates showing an elastomer property.

When conventional polycarbonate base resins are used to obtain molded articles having a thickness and a thickness difference such as optical lenses, an optical strain remains to a large extent to provide a problem. Use of the PC copolymers of the present invention makes it possible to reduce an optical strain which provides a problem, and therefore the lens performance can be expected to be enhanced (for example, reduced in birefringence).

Further, also in molding light guide plate light guide plates which are very thin and to which a high transferring property is required, the light guide plates which are improved in a transferring property can be obtained, and the performances of the light guide plates, for example, the luminance can be expected to be further enhanced. In addition thereto, it is expected that the light guide plates can be further reduced in a thickness.

INDUSTRIAL APPLICABILITY

According to the present invention, optical molded articles, light guide plates and lenses which are improved in a luminance and reduced in a birefringence can be obtained.

The invention claimed is:

1. A copolycarbonate comprising repetitive units represented by the following Formulas (I) and (II):

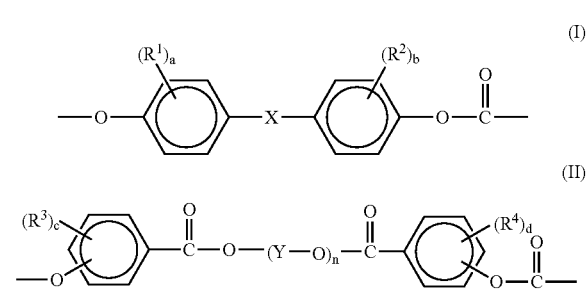

wherein
$R^1$ and $R^2$ each represent independently an alkyl group having 1 to 6 carbon atoms;
X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— or a bond represented by the following Formulae (III-1) or (III-2):

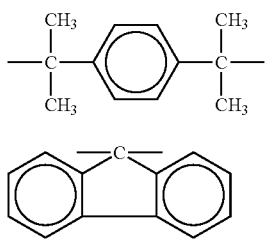

(III-1)

(III-2)

R³ and R⁴ each represent independently an alkyl group having 1 to 3 carbon atoms;

Y represents a linear or branched alkylene group having 2 to 15 carbon atoms;

a to d each are an integer of 0 to 4; and n is an integer of 2 to 450;

wherein a content of the repetitive unit represented by Formula (II) described above is 1 to 30 mass %, and a viscosity number is 30 to 71.

2. The copolycarbonate of claim 1, wherein in Formula (II), Y is at least one selected from $-CH_2-CH_2-CH_2-CH_2-$, $-CH_2-CH_2-CH_2-CH(CH_3)-$ and $-CH_2-CH_2-CH_2-$.

3. The copolycarbonate of claim 1, wherein the viscosity number is 37 to 62.

4. The copolycarbonate of claim 1, wherein a flow value (Q value) at 280° C. is $30 \times 10^{-2}$ mL/s or more.

5. A copolycarbonate composition comprising the copolycarbonate of claim 1 and at least one other polycarbonate resin.

6. A polycarbonate base resin composition comprising
(A) 100 mass parts of the copolycarbonate of claim 1, and
(B) 0.01 to 1 mass part of an acryl base resin having a molecular weight of 200 to 100,000.

7. The polycarbonate base resin composition of claim 6, further comprising a compound selected from the group consisting of (C) 0.01 to 1 mass part of an alicyclic epoxy compound and (D) 0.01 to 3 mass parts of a polysiloxane compound comprising at least one functional group; wherein the at least one functional group is selected from the group consisting of an alkoxy group, a vinyl group, a phenyl group, and combinations thereof.

8. A polycarbonate base resin composition comprising
(A) 100 mass parts of the copolycarbonate composition of claim 5, and
(B) 0.01 to 1 mass part of an acryl base resin having a molecular weight of 200 to 100,000.

9. The polycarbonate base resin composition as described in claim 8, further comprising
a compound selected from the group consisting of
(C) 0.01 to 1 mass part of an alicyclic epoxy compound and
(D) 0.01 to 3 mass parts of a polysiloxane compound comprising at least one functional group; wherein the at least one functional group is selected from the group consisting of an alkoxy group, a vinyl group, a phenyl group and combinations thereof.

10. An optical molded article comprising the copolycarbonate of claim 1.

11. A light guide plate comprising the copolycarbonate of claim 1.

12. A lens comprising the copolycarbonate of claim 1.

13. An optical molded article comprising the copolycarbonate composition of claim 5.

14. A light guide plate comprising the copolycarbonate composition of claim 5.

15. A lens comprising the copolycarbonate composition of claim 5.

16. An optical molded article comprising the polycarbonate base resin composition of claim 6.

17. A light guide plate comprising the polycarbonate base resin composition of claim 6.

18. A lens comprising the polycarbonate base resin composition of claim 6.

19. An optical molded article comprising the polycarbonate base resin composition of claim 7.

20. A light guide plate comprising the polycarbonate base resin composition of claim 7.

* * * * *